United States Patent
Hiraga

(10) Patent No.: US 12,557,188 B2
(45) Date of Patent: Feb. 17, 2026

(54) LIGHT SOURCE DRIVING DEVICE, LIGHT EMITTING DEVICE, AND LIGHT SOURCE DRIVING METHOD

(71) Applicant: Sharp NEC Display Solutions, Ltd., Tokyo (JP)

(72) Inventor: Takashi Hiraga, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 121 days.

(21) Appl. No.: 18/414,945

(22) Filed: Jan. 17, 2024

(65) Prior Publication Data

US 2024/0155745 A1     May 9, 2024

Related U.S. Application Data

(63) Continuation of application No. PCT/JP2021/027668, filed on Jul. 27, 2021.

(51) Int. Cl.
    *H05B 45/10*     (2020.01)
    *H05B 45/345*     (2020.01)

(52) U.S. Cl.
    CPC ........... *H05B 45/10* (2020.01); *H05B 45/345* (2020.01)

(58) Field of Classification Search
    CPC ...... H05B 45/10; H05B 45/345; H05B 45/58; H01S 5/06; H10H 20/80
    See application file for complete search history.

(56) References Cited

U.S. PATENT DOCUMENTS

2015/0334792 A1* 11/2015 Jung ..................... H05B 45/10
                                                             315/186
2017/0070031 A1    3/2017   Takigawa et al.

FOREIGN PATENT DOCUMENTS

CN       106489304 A  *   3/2017             H05B 45/48
DE    102018107527 A1  * 10/2018             H05B 45/37
(Continued)

OTHER PUBLICATIONS

International Search Report in PCT/JP2021/027668 dated Aug. 24, 2021 with English translation thereof.

*Primary Examiner* — Abdullah A Riyami
*Assistant Examiner* — Syed M Kaiser
(74) *Attorney, Agent, or Firm* — McGinn IP Law Group, PLLC

(57) ABSTRACT

Disclosed is a light source driving device (20) for driving a plurality of light emitting element groups in a light source device that outputs combined light obtained by combining light emitted from the light emitting element groups, the light source driving device including a control circuit (201) that supplies a current that alternately repeats a first period in which a first current is supplied and a second period in which a second current having a current value different from a current value of the first current is supplied to the plurality of light emitting element groups, the second current being supplied to a second light emitting element group in a case where the first current is being supplied to a first light emitting element group, and the first current being supplied to the second light emitting element group in a case where the second current is being supplied to the first light emitting element group, wherein a target value of a light intensity obtained by the combined light is a light intensity that is higher than a light intensity obtained in a case where a current having a rated value is applied to any one of the light emitting element groups, and wherein a total of the current value of the first current and the current value of the second current is greater than the rated value.

8 Claims, 5 Drawing Sheets

(56) References Cited

FOREIGN PATENT DOCUMENTS

| | | |
|---|---|---|
| JP | 2006-049445 A | 2/2006 |
| JP | 2006-302981 A | 11/2006 |
| JP | 2009-208764 A | 9/2009 |
| JP | 2017-054931 A | 3/2017 |

* cited by examiner

LIGHT SOURCE DRIVING DEVICE, LIGHT EMITTING DEVICE, AND LIGHT SOURCE DRIVING METHOD

TECHNICAL FIELD

The present invention relates to a light source driving device, a light emitting device, and a light source driving method.

BACKGROUND ART

The life of light emitting elements such as laser diodes and light emitting diodes (LEDs) is inversely proportional to a current value and a junction temperature. For this reason, it is conceivable to lower a driving current value in order to further extend the life of laser diodes or LEDs. Patent Document 1 proposes reducing the influence of individual differences in life between groups of laser diode modules by equalizing the light conversion efficiency between the groups of laser diode modules.

CITATION LIST

Patent Document

[Patent Document 1]
  Japanese Unexamined Patent Application, First Publication No. 2017-54931

SUMMARY OF INVENTION

Technical Problem

However, the light intensity of laser diodes and LEDs decreases as a current value decreases. For this reason, if a current value is simply lowered in order to extend the life, it is necessary to increase the number of laser diodes and LEDs in order to obtain the required light output, and thus there is a problem that the size of a device is increased. Further, a method of lowering a junction temperature by increasing the cooling capacity has a problem of increasing the cost and increasing the size of a light source device.

In Patent Document 1, driving currents are allocated to a plurality of laser diode groups to maximize the overall light conversion efficiency. In order to perform such a process, it is necessary to obtain the light conversion efficiency using light output characteristics data or the like indicating the relationship between the driving current and the light output, which complicates the process.

In view of the above-described problems, an object of the present invention is to provide a light source driving device, a light emitting device, and a light source driving method that can improve the life of light emitting elements by curbing increase in size of the device while obtaining a desired light output.

Solution to Problem

A light emitting device according to an aspect of the present invention is a light source driving device for driving a plurality of light emitting element groups in a light source device that outputs combined light obtained by combining light emitted from the light emitting element groups, the light source driving device including a control circuit that supplies a current that alternately repeats a first period in which a first current is supplied and a second period in which a second current having a current value different from a current value of the first current is supplied to the plurality of light emitting element groups, the second current being supplied to a second light emitting element group in a case where the first current is being supplied to a first light emitting element group, and the first current being supplied to the second light emitting element group in a case where the second current is being supplied to the first light emitting element group, wherein a target value of a light intensity obtained by the combined light is a light intensity that is higher than a light intensity obtained in a case where a current having a rated value is applied to any one of the light emitting element groups, and wherein a total of the current value of the first current and the current value of the second current is greater than the rated value.

According to an aspect of the present invention, there is provided a light source device including: a plurality of light emitting element groups; a driving power supply circuit provided for each of the plurality of light emitting element groups; a light combining lens that outputs combined light by combining light emitted from the plurality of light emitting element groups; and a control circuit that supplies a current that alternately repeats a first period in which a first current is supplied and a second period in which a second current having a current value different from a current value of the first current is supplied to the plurality of light emitting element groups, the second current being supplied to a second light emitting element group in a case where the first current is being supplied to a first light emitting element group, and the first current being supplied to the second light emitting element group in a case where the second current is being supplied to the first light emitting element group, wherein a target value of a light intensity obtained by the combined light is a light intensity that is higher than a light intensity obtained in a case where a current having a rated value is applied to any one of the light emitting element groups, and wherein a total of the current value of the first current and the current value of the second current is greater than the rated value.

According to an aspect of the present invention, there is provided a light source driving method for driving a plurality of light emitting element groups in a light source device that outputs combined light obtained by combining light emitted from the light emitting element groups, the light source driving device including supplying a current that alternately repeats a first period in which a first current is supplied and a second period in which a second current having a current value different from a current value of the first current is supplied to the plurality of light emitting element groups, wherein the supplying of the current to the plurality of light emitting element groups includes supplying the second current to a second light emitting element group in a case where the first current is being supplied to a first light emitting element group and supplying the first current to the second light emitting element group in a case where the second current is being supplied to the first light emitting element group, wherein a target value of a light intensity obtained by the combined light is a light intensity that is higher than a light intensity obtained in a case where a current having a rated value is applied to any one of the light emitting element groups, and wherein a total of the current value of the first current and the current value of the second current is greater than the rated value.

Advantageous Effects of Invention

According to the present invention, it is possible to improve the life of the light emitting elements while obtaining a desired light output.

DESCRIPTION OF EMBODIMENTS

Figure 1:
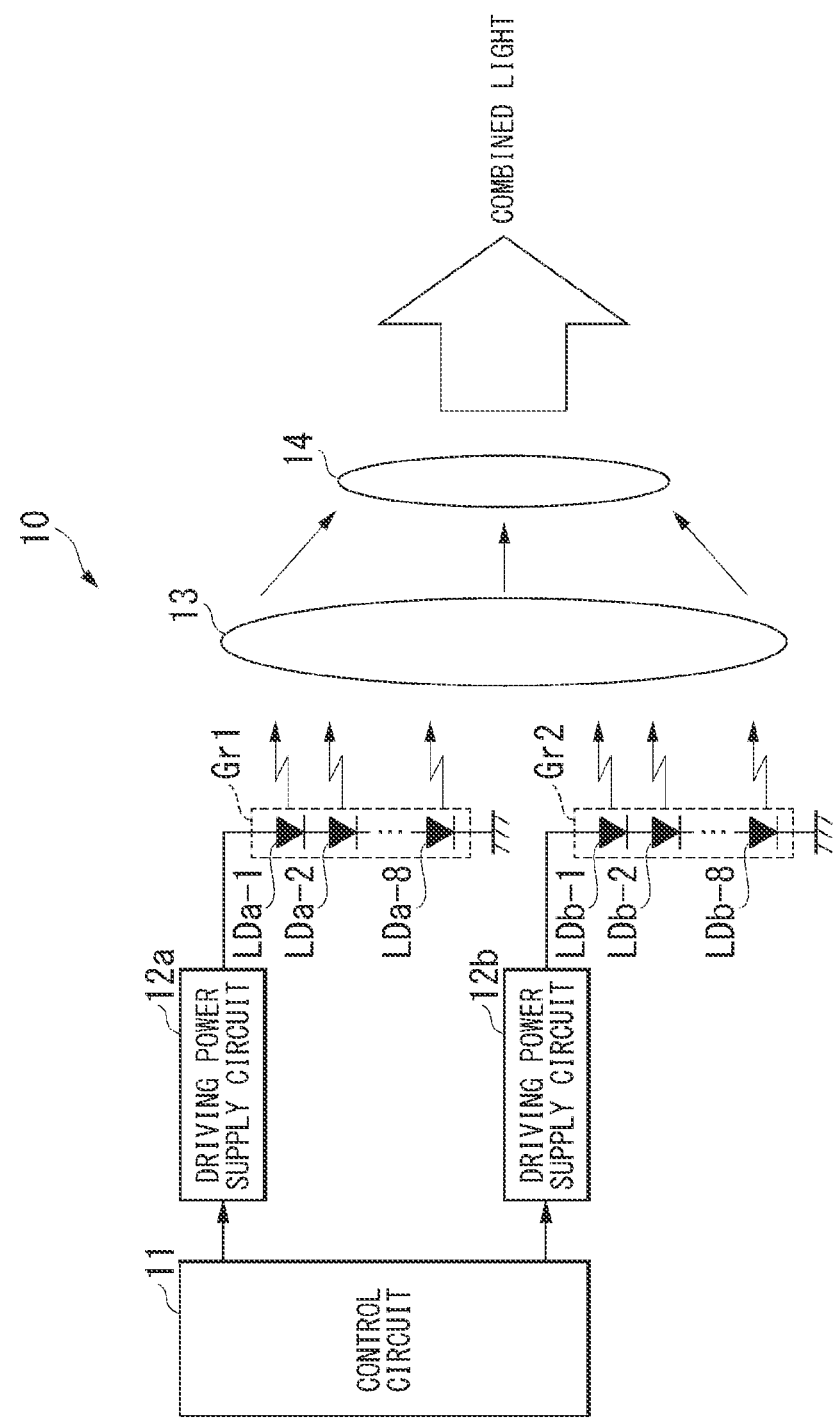
FIG. 1 is a block diagram showing a schematic configuration of a light emitting device according to a first embodiment of the present invention.

Hereinafter, embodiments of the present invention will be described with reference to the drawings. FIG. 1 is a block diagram showing a schematic configuration of a light emitting device according to a first embodiment of the present invention. As shown in FIG. 1, a light emitting device 10 according to the present embodiment includes a plurality of light emitting element groups, a control circuit 11, driving power supply circuits 12a and 12b, and light combining lenses 13 and 14.

The control circuit 11 is connected to the driving power supply circuit 12a and the driving power supply circuit 12b. The driving power supply circuit 12a is connected to the control circuit 11 and is also connected to a light emitting element group Gr1. The driving power supply circuit 12b is connected to the control circuit 11 and is also connected to a light emitting element group Gr2.

A plurality of light emitting element groups simply have to be provided. Here, there are two light emitting element groups, the light emitting element group Gr1 as a first group and the light emitting element group Gr2 as a second group. The number of light emitting element groups may be three or more. At least one light emitting element simply has to belong to a light emitting element group.

The light emitting element outputs light with a brightness corresponding to the current supplied. The light emitting element may be either a laser diode or an LED, for example. In this example, a case in which eight light emitting elements belong to one light emitting element group will be described. Specifically, laser diodes LDa-1 to LDa-8 belong to the first group, and laser diodes LDb-1 to LDb-8 belong to the second group.

The laser diodes LDa-1 to LDa-8 are connected in series. The laser diodes LDb-1 to LDb-8 are connected in series. The laser diodes LDa-1 to LDa-8 and the laser diodes LDb-1 to LDb-8 radiate laser light as output light by emitting light.

In the present embodiment, the laser diodes are driven by alternately switching the current value between a high current value and a low current value for each group.

The control circuit 11 is a control circuit that supplies a current that alternately repeats a first period in which a first current is supplied and a second period in which a second current having a current value different from a current value of the first current is supplied to the plurality of light emitting element groups, the second current is supplied to a second light emitting element group in a case where the first current is being supplied to a first light emitting element group, and the first current is supplied to the second light emitting element group in a case where the second current is being supplied to the first light emitting element group.

A target value of a light intensity obtained by the combined light is a light intensity that is higher than a light intensity obtained in a case where a current having a rated value is applied to any one of the light emitting element groups. A total of the current value of the first current and the current value of the second current is greater than the rated value.

For example, a total value of the light outputs from the light emitting element groups (a total value of the light intensities of the output light) simply has to be the target value.

The rated value is a value representing the rated current value that can be supplied to the light emitting element. The rated value may be a value set individually for each light emitting element, or may be a value set for the light emitting element group.

The target value is set such that the relationship between a light output Or obtained in a case where the current having the rated value is supplied to one light emitting element group and a light output Os of the combined light is Or<Os. As a result, even if a desired light output is a light output that cannot be obtained from one light emitting element group, the desired light output can be obtained using a plurality of light emitting element groups.

The control circuit 11 controls the driving power supply circuit to supply a current to at least two of the plurality of light emitting element groups. Here, the control circuit 11 supplies a current to the light emitting element groups Gr1 and Gr2 by controlling the driving power supply circuit 12a and the driving power supply circuit 12b. In a case where the number of light emitting element groups is three or more, if the light output (the light intensity) of the combined light is a target value, the control circuit 11 may supply a current to at least two light emitting element groups and may stop the supply of a current to the remaining light emitting element groups. That is, as long as a current is supplied to at least two light emitting element groups, it is not necessary to supply a current to all light emitting element groups.

When a current is supplied to a plurality of light emitting element groups, the control circuit 11 supplies currents having different current values to at least two of the plurality of light emitting element groups. By using different current values, the life of the light emitting elements can be extended as will be described below.

The control circuit 11 may supply the current having the rated value to at least one light emitting element group of the plurality of light emitting element groups. In this case, the total value of the light outputs from the light emitting element groups simply has to be the target value, and thus the control circuit 11 simply has to supply a current value corresponding to a difference from the target value to a light emitting element group different from the light emitting element group to which the current having the rated value is supplied.

In this case, the current value to be supplied to each light emitting element group can be determined on the basis of the rated value. In addition, since the current having the rated value is supplied to at least one light emitting element group, a difference from the current value supplied to the other light emitting element groups can be increased, and the life of the light emitting elements can be extended.

In addition, by driving at least one light emitting element group at the rated value, it is possible to suppress the current value to be borne by the other light emitting element groups in order to reach the target value of the light output of the combined light, and thus it is possible to suppress the required number of the other light emitting element groups. Therefore, a desired light output (a desired light intensity) can be obtained while suppressing an increase in the size of the light source device.

The control circuit 11 may supply a current having a suppliable lower limit value to at least one light emitting element group of the plurality of light emitting element groups. In this case, the total value of the light outputs from the light emitting element groups simply has to be the target value, and thus the control circuit 11 simply has to supply a current value corresponding to a difference from the target value to a light emitting element group different from the light emitting element group to which the current having the suppliable lower limit value is supplied.

In this case, the current value to be supplied to each light emitting element group can be determined on the basis of the suppliable lower limit value. In addition, since the current having the suppliable lower limit value is supplied to at least one light emitting element group, a difference from the current value supplied to the other light emitting element groups can be increased, and the life of the light emitting elements can be extended.

The control circuit 11 controls the driving power supply circuits 12a and 12b such that the driving current to the first group of the laser diodes LDa-1 to LDa-8 and the driving current to the second group of the laser diodes LDb-1 to LDb-8 are alternately switched between the low current value and the high current value. The switching period between the low current value and the high current value is arbitrary, but in order to ensure that the light output combined by the light combining lens 13 and 14 is constant, the control circuit 11 controls such that the current value is alternately switched between the low current value and the high current value at equal times for the group of laser diodes LDa-1 to LDa-8 and the group of laser diodes LDb-1 to LDb-8.

The control circuit 11 switches the current value to be supplied to each light emitting element group in each light emitting element group such that times for supplying are equal in a total usage time. The total usage time may be any period during which the light emitting element is driven. For example, the period from a certain point in the past to t1 seconds after the present is defined as the total usage time, and the current value supplied simply has to be assigned to be the same in each light emitting element group during the period until the time t1 seconds later. As a result, the load on each light emitting element in the plurality of light emitting element groups can be made approximately the same, and the life of the light emitting elements can be extended.

The driving power supply circuit 12a drives the laser diodes LDa-1 to LDa-8 by switching the current value between the low current value and the high current value on the basis of a control signal from the control circuit 11. The driving power supply circuit 12b drives the laser diodes LDb-1 to LDb-8 by switching the current value between the low current value and the high current value on the basis of a control signal from the control circuit 11.

The light combining lenses 13 and 14 combine laser light from the plurality of laser diodes LDa-1 to LDa-8 and LDb-1 to LDb-8 to obtain a desired light output.

Figure 2A:
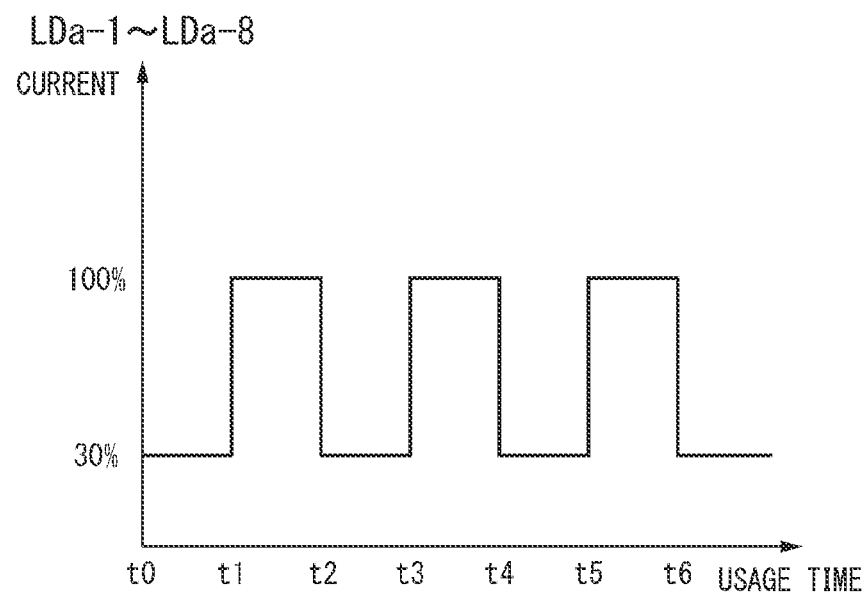
FIG. 2A is an explanatory diagram of driving timings of laser diodes in each group in the light emitting device according to the first embodiment of the present invention.
Figure 2B:
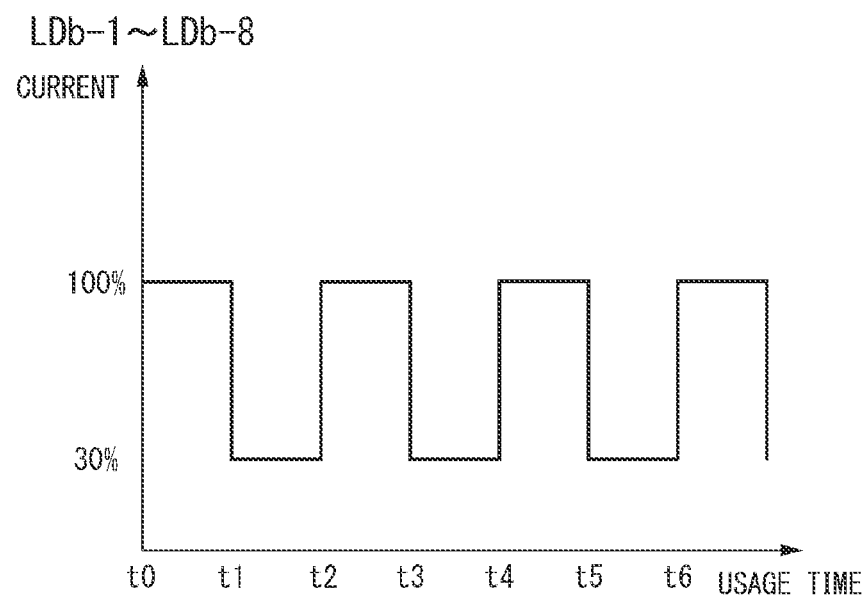
FIG. 2B is an explanatory diagram of driving timings of laser diodes in each group in the light emitting device according to the first embodiment of the present invention.

FIGS. 2A and 2B are explanatory diagrams of driving timings of the laser diodes in each group in the light emitting device 10 according to the first embodiment of the present invention. FIG. 2A shows the driving timing of the group of laser diodes LDa-1 to LDa-8, and FIG. 2B shows the driving timing of the group of laser diodes LDb-1 to LDb-8.

As shown in FIGS. 2A and 2B, at times t0 to t1, the group of laser diodes LDa-1 to LDa-8 is driven at a low current value that is a current value of 30% of the rated value, and the group of laser diode LDb-1 to LDb-8 is driven at a high current value that is a current value of 100% of the rated value.

At times t1 to t2, the group of laser diodes LDa-1 to LDa-8 is driven at a high current value that is a current value of 100% of the rated value, and the group of laser diode LDb-1 to LDb-8 is driven at a low current value that is a current value of 30% of the rated value.

Hereinafter, at times t2 to t3, t4 to t5, . . . , the group of laser diodes LDa-1 to LDa-8 is driven at a low current value that is a current value of 30% of the rated value, and the group of laser diode LDb-1 to LDb-8 is driven at a high current value which is a current value of 100% of the rated value.

In addition, at times t3 to t4, t5 to t6, . . . , the group of laser diodes LDa-1 to LDa-8 is driven at a high current value that is a current value of 100% of the rated value, and the group of laser diode LDb-1 to LDb-8 is driven at a low current value that is a current value of 30% of the rated value.

In this way, in the present embodiment, a desired light output is obtained by dividing the laser diodes into two groups LDa-1 to LDa-8 and LDb-1 to LDb-8, alternately switching the driving current of the laser diodes between the high current value and the low current value for each group, and combining the light output from the two groups LDa-1 to LDa-8 and LDb-1 to LDb-8. As a result, it is possible to improve the life of the laser diodes while maintaining a desired amount of light. This will be explained below.

The life of the laser diodes or the LEDs is inversely proportional to a current value and a junction temperature, as shown in the following equations.

$$L = \beta_1 \times I_F^{-\beta_2} \times \exp(Ea/(k \times Tj))$$ [Math. 1]

L: Life [h]
$\beta_1$: Deterioration coefficient 1
$\beta_2$: Deterioration coefficient 2
$I_F$: Current [A]
Ea: Activated energy [eV]
k: Boltzmann constant [eV/K]
Tj: Junction temperature [K]

$$Tj = (Rth \times ((I_F \times V_F) - Po)) + Ta$$

Rth: Thermal resistance [° C./W]
$V_F$: Voltage [V]
Po: Light output [W]
Tc: Case temperature [K]

As described above, in the embodiment of the present invention, the laser diodes LDa-1 to LDa-8 and the laser diodes LDb-1 to LDb-8 are driven by alternately switching the current value between the low current value that is a current value of 30% of the rated value and the high current value that is a current value of 100% of the rated value such that the times are equal, for example. In this case, the life of the laser diodes can be obtained as follows. In this example, the values of parameters are set as follows for calculation.
[Math. 2]
$\beta_1$: Deterioration coefficient 1=6
$\beta_2$: Deterioration coefficient 2=1
Ea: Activated energy [eV]=0.3
k: Boltzmann constant [eV/K]=$8.617 \times 10^{-5}$
Rth: Thermal resistance [° C./W]=1
$V_F$: Voltage [V]=32
Po: Light output [W]=$I_F \times 10$
Tc: Case temperature [K]=343.15
$I_F$: Rated current=2.0 [A]

The life of the laser diodes when driven at a current of 30% of the rated current is 174,983 hours from the above equation. Further, the life of the laser diodes when driven at a current of 100% of the rated current is 24,130 hours. When the current value of the two groups of laser diodes LDa-1 to LDa-8 and LDb-1 to LDb-8 is periodically switched between 30% and 100% such that times are equal in the total usage time, the total life is 99,557 hours that is an average value thereof. For the group of laser diodes LDa-1 to LDa-8 and the group of laser diodes LDb-1 to LDb-8, the current value is alternately switched at equal times, and thus a total light output of the laser diodes LDa-1 to LDa-8 and LDb-1 to LDb-8 is constant, and the total light output at this time is (100%+30%=130%).

Figure 3:
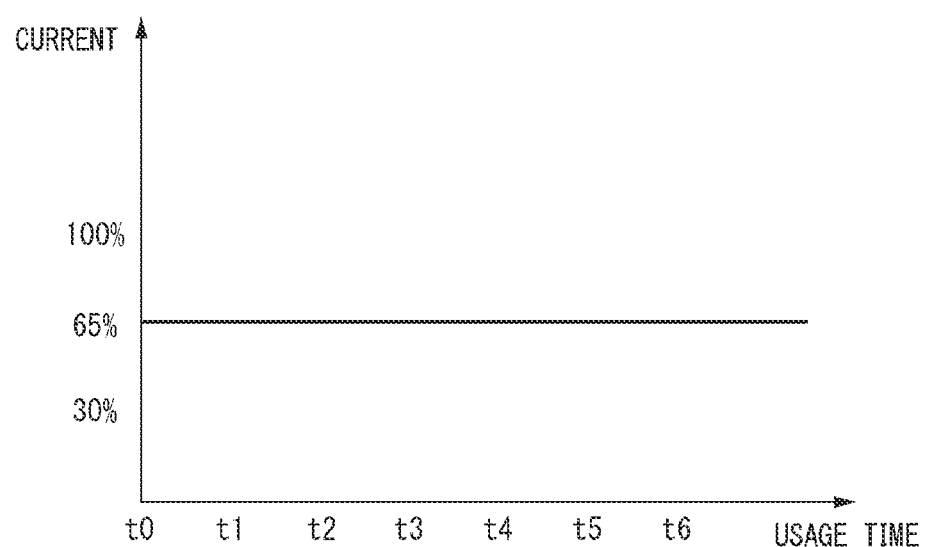
FIG. 3 is an explanatory diagram when laser diodes are continuously driven.

On the other hand, normally, the laser diodes are continuously driven at a predetermined current value without changing the current value for each group. FIG. 3 is an explanatory diagram when the laser diodes are continuously driven. As shown in FIG. 3, the laser diodes LDa-1 to LDa-8 and LDb-1 to LDb-8 are driven at continuous current values, and in order to obtain a light output of (100%+30%=130%) as in the above-described embodiment, the laser diodes LDa-1 to LDa-8 and LDb-1 to LDb-8 simply have to be driven at 65% of the rated current (65%+65%=130%). When the laser diodes LDa-1 to LDa-8 and LDb-1 to LDb-8 are continuously driven at 65% of the rated current, the life of the laser diodes is 53,881 hours according to the above equation.

In this way, in a case where the two groups of laser diodes LDa-1 to LDa-8 and laser diodes LDb-1 to LDb-8 are driven by alternately switching the current value between the low current value and the high current value, the life of the laser diodes LDa-1 to LDa-8 and LDb-1 to LDb-8 is 99,557 hours. On the other hand, in a case where the laser diodes LDa-1 to LDa-8 and LDb-1 to LDb-8 are continuously driven at a constant current value, the life is 53,881 hours. In this way, in the present embodiment, it is possible to improve the life of the laser diodes by driving the group of laser diodes LDa-1 to LDa-8 and the group of laser diodes LDb-1 to LDb-8 while alternately switching the current value between the low current value and the high current value such that the times are equal.

Further, another calculation example will be shown to explain how the life of the laser diodes can be improved by the present embodiment. In general, the life of semiconductors such as laser diodes and LEDs is inversely proportional to the square of the magnitude of a current. Taking a laser diode with a rated current value of 2.0 A as an example, a current value 65% of the rated current value is 1.3 A, a current value 30% of the rated current value is 0.6 A, and a current value of 100% of the rated current value is 2.0 A. Therefore, with respect to the life of the laser diodes with a current value of 65% of the rated current value, at a current value of 30% of the rated current value, the life of the laser diodes is ((1.3/0.6) 2=469%), and at a current value of 100% of the rated current value, the life of the laser diodes is ((1.3/2.0) 2=42%). When the current value of the two groups of laser diodes LDa-1 to LDa-8 and LDb-1 to LDb-8 is periodically switched between the current value of 30% of the rated value and the current value of 100% of the rated value such that times are equal in the total usage time, a total life improvement rate is 256% that is an average value of 469% and 42%. As a result, in the present embodiment, the life of the laser diodes is improved by 256%.

Even if the period of switching the current value of the two groups of the laser diodes LDa-1 to LDa-8 and LDb-1 to LDb-8 is extended the maximum to half the life time, the same life improvement effect can be obtained, and there is no limit to the switching period. However, the inclination of the decrease over time in the total light output of the two groups of the laser diodes LDa-1 to LDa-8 and LDb-1 to LDb-8 increases as the switching period becomes longer, and the amount by which the total light output recovers and rises after switching increases. It is desirable to shorten the switching period in order to keep the inclination of the decrease over time in the total light output constant, including at the time of switching.

Further, in the above-described embodiment, the current value of 100% of the rated current value and the current value of 30% of the rated current value have been described, but as a difference between a high current and a low current which are supplied to the laser diodes is larger, the effect of improving the life is greater. Therefore, the high current value supplied to the laser diodes LDa-1 to LDa-8 and LDb-1 to LDb-8 is set to 100% of the rated maximum current value, and the low current value is set to a current value necessary for the total light output of the laser diodes LDa-1 to LDa-8 and LDb-1 to LDb-8 to reach a desired output. In a case where this low current value is below the output lower limit value of the driving power supply circuits 12a and 12b, the high current value is reduced from 100% of the rated value to obtain the necessary total light output value.

As described above, in the light emitting device according to the present embodiment, the laser diodes are divided into two groups, the groups are driven by alternately switching the current value between the high current value and the low current value for each group, and the light output from the laser diodes is combined, and thus it is possible to improve the life of the laser diodes while ensuring a desired light output.

In addition, in the above-described embodiment, a laser diode is used as an optical element, but the present invention can be similarly applied to a case where an LED is used as an optical element.

Further, in the above-described embodiment, the plurality of laser diodes are divided into two groups, but the number of divided groups may be any number. Also, in the above-described embodiment, eight laser diodes are arranged in one group, but the number of laser diodes arranged in one group may be any number.

Figure 4:
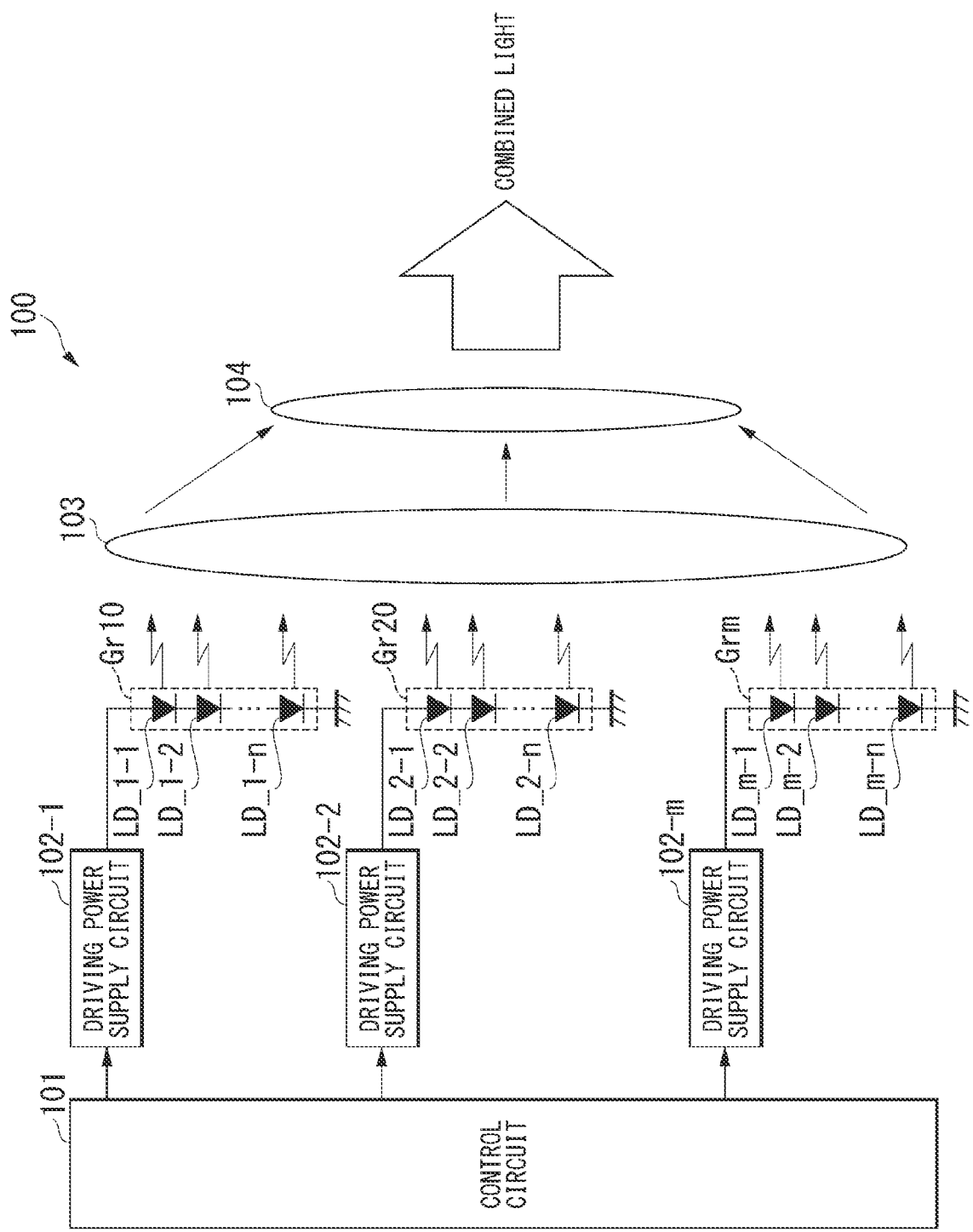
FIG. 4 is a schematic block diagram of a light emitting device.

FIG. 4 is a schematic block diagram of a light emitting device in another embodiment. A light emitting device 100 according to the present invention is constituted by light emitting elements LD_1-1 to LD_1-*n*, LD_2-1 to LD_2-*n*, . . . , LD_m-1 to LD_m-n, a light combining lenses 103 and 104, a driving power supply circuit 102-1, 102-2, . . . , 102-*m*, and a control circuit 101.

The light emitting elements LD_1-1 to LD_1-*n*, LD_2-1 to LD_2-*n*, . . . , LD_m-1 to LD_m-n are divided into m groups (m is an any integer). The light combining lenses 103 and 104 combine light from a plurality of light emitting elements LD_1-1 to LD_1-$n$, LD_2-1 to LD_2-$n$, ..., LD_m-1 to LD_m-n. The driving power supply circuits 102-1, 102-2, ..., 102-$m$ drive the light emitting elements LD_1-1 to LD_1-$n$, LD_2-1 to LD_2-$n$, ..., LD_m-1 to LD_m-n belonging to the groups for each group. The control circuit 101 controls such that the driving current of the light emitting elements LD_1-1 to LD_1-$n$, LD_2-1 to LD_2-$n$, ..., LD_m-1 to LD_m-n is alternately switched between a high current value and a low current value for each group.

According to the above-described embodiment, the light emitting elements are divided into a plurality of groups, and the groups are driven by alternately switching the current value between a high current value and a low current value for each group, and thus the light output from the light emitting elements is combined. As a result, it is possible to improve the life of the light emitting elements while ensuring a desired light output. Furthermore, in the image display device and lighting device using the light source device, it is also possible to reduce maintenance costs for parts replacement and initial introduction and operation costs.

Figure 5:
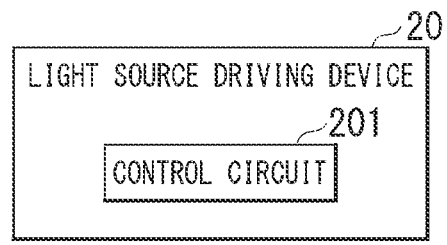
FIG. 5 is a schematic block diagram of a light source driving device 20 in another embodiment.

FIG. 5 is a schematic block diagram of a light source driving device 20 in another embodiment.

The light source driving device 20 drives a plurality of light emitting element groups in a light source device that outputs combined light obtained by combining light emitted from the light emitting element groups.

The control circuit 201 supplies the current values to the light emitting element groups such that the target value of the light output obtained by the combined light is a light output that is larger than the light output in a case where the current having the rated value is applied to any one of the light emitting element groups and the output of the combined light in which a total of the current values supplied to at least two of the light emitting element groups is larger than the rated value and the output of the combined light is the target value.

Such a light source driving device 20 can drive each light emitting element to extend the life of the light emitting element group by being connected to a unit in which the light emitting element group is provided.

Figure 6:
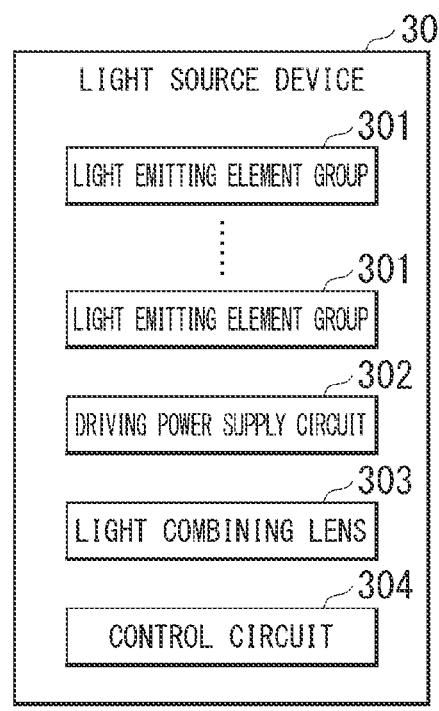
FIG. 6 is a schematic block diagram of a light source device 30 in another embodiment.

FIG. 6 is a schematic block diagram of a light source device 30 in another embodiment.

The light source device 30 includes a light emitting element group 301, a driving power supply circuit 302, a light combining lens 303, and a control circuit 304.

A plurality of light emitting element groups 301 are provided in the light source device 30.

One driving power supply circuit 302 is connected to each of the plurality of light emitting element groups.

The light combining lens 303 outputs combined light by combining light emitted from the plurality of light emitting element groups.

The control circuit 304 is a control circuit that supplies a current that alternately repeats a first period in which a first current is supplied and a second period in which a second current having a current value different from a current value of the first current is supplied to the plurality of light emitting element groups, the second current is supplied to a second light emitting element group in a case where the first current is being supplied to a first light emitting element group, and the first current is supplied to the second light emitting element group in a case where the second current is being supplied to the first light emitting element group.

Here, a target value of a light intensity obtained by the combined light is a light intensity that is higher than a light intensity obtained in a case where a current having a rated value is applied to any one of the light emitting element groups. A total of the current value of the first current and the current value of the second current is greater than the rated value.

All or a part of the light emitting device 10, 100 in the above-described embodiments may be realized by a computer. In that case, a program for realizing this function may be recorded on a computer-readable recording medium and the program recorded on the recording medium may be read and executed by a computer system to realize the functions. The term "computer system" as used herein includes an OS and hardware such as peripheral devices. In addition, the "computer-readable recording medium" is a storage device such as a portable medium, for example, a flexible disk, a magneto-optical disk, a ROM, or a CD-ROM, or a hard disk built in the computer system. Furthermore, examples of the "computer-readable recording medium" may include a communication line that dynamically holds a program a short period of time in a case where the program is transmitted via a network such as the Internet or a communication channel such as a telephone channel and a volatile memory inside the computer system which serves as a server or client in that case and holds the program for a certain period of time. Further, the program may be for realizing a part of the functions described above, may be capable of realizing the functions described above in combination with a program already recorded in the computer system, or may be realized using a programmable logic device such as FPGA.

In the above, the embodiments of this invention have been described in detail with reference to the drawings, but the specific configuration is not limited to the embodiments, and a design and the like within a range not departing from the gist of this invention are also included.

REFERENCE SIGNS LIST

LDa-1 to LDa-8, LDb-1 to LDb-8, LD_1-1 to LD_m-n Laser diode
10, 100 Light emitting device
11, 101, 201, 303 Control circuit
12$a$, 12$b$, 102-1 to 102-$m$, 302 Driving power supply circuit
13, 14, 103, 104 Light combining lens
20 Light source driving device
30 Light source device
301, Gr1, Gr2 Light emitting element group

What is claimed is:

1. A light source driving device for driving a plurality of light emitting element groups, which includes a first light emitting element group and a second light emitting element group, in a light source device that outputs combined light obtained by combining light emitted from the light emitting element groups, the light source driving device comprising:
a control circuit that supplies a current that alternately repeats a first period in which a first current is supplied and a second period in which a second current having a current value different from a current value of the first current is supplied to the plurality of light emitting element groups, the second current being supplied to the second light emitting element group in a case where the first current is being supplied to the first light emitting element group, and the first current being supplied to the second light emitting element group in a case where the second current is being supplied to the first light emitting element group,
wherein a target value of a light intensity obtained by the combined light is a light intensity that is higher than a light intensity obtained in a case where a current having a rated value is applied to any one of the light emitting element groups, and wherein a total of the current value of the first current and the current value of the second current is greater than the rated value.

2. The light source driving device according to claim 1, wherein the control circuit supplies a current having the rated value to at least one light emitting element group of the plurality of light emitting element groups.

3. The light source driving device according to claim 1, wherein the control circuit supplies a current having a suppliable lower limit value to at least one light emitting element group of the plurality of light emitting element groups.

4. The light source driving device according to claim 1, wherein the control circuit switches the current value to be supplied to each light emitting element group in each light emitting element group such that times for supplying are equal in a total usage time.

5. The light source driving device according to claim 1, wherein a light emitting element included in the plurality of light emitting element groups is a laser diode.

6. The light source driving device according to claim 1, wherein at least one light emitting element is included in the plurality of light emitting element groups.

7. A light source device comprising:
a plurality of light emitting element groups, which includes a first light emitting element group and a second light emitting element group;
a driving power supply circuit provided for each of the plurality of light emitting element groups;
a light combining lens that outputs combined light by combining light emitted from the plurality of light emitting element groups; and
a control circuit that supplies a current that alternately repeats a first period in which a first current is supplied and a second period in which a second current having a current value different from a current value of the first current is supplied to the plurality of light emitting element groups, the second current being supplied to the second light emitting element group in a case where the first current is being supplied to the first light emitting element group, and the first current being supplied to the second light emitting element group in a case where the second current is being supplied to the first light emitting element group, wherein a target value of a light intensity obtained by the combined light is a light intensity that is higher than a light intensity obtained in a case where a current having a rated value is applied to any one of the light emitting element groups, and wherein a total of the current value of the first current and the current value of the second current is greater than the rated value.

8. A light source driving method for driving a plurality of light emitting element groups, which includes a first light emitting element group and a second light emitting element group, in a light source device that outputs combined light obtained by combining light emitted from the light emitting element groups, the light source driving method comprising
supplying a current that alternately repeats a first period in which a first current is supplied and a second period in which a second current having a current value different from a current value of the first current is supplied to the plurality of light emitting element groups,
wherein the supplying of the current to the plurality of light emitting element groups includes supplying the second current to the second light emitting element group in a case where the first current is being supplied to the first light emitting element group and supplying the first current to the second light emitting element group in a case where the second current is being supplied to the first light emitting element group,
wherein a target value of a light intensity obtained by the combined light is a light intensity that is higher than a light intensity obtained in a case where a current having a rated value is applied to any one of the light emitting element groups, and
wherein a total of the current value of the first current and the current value of the second current is greater than the rated value.

* * * * *